United States Patent [19]

St. John et al.

[11] 4,276,092

[45] Jun. 30, 1981

[54] MANUFACTURE OF CEMENT

[75] Inventors: Charles F. St. John, Beaconsfield; Gil A. Mercier, Pointe Claire, both of Canada

[73] Assignee: Lafarge Consultants Ltd., Montreal, Canada

[21] Appl. No.: 99,310

[22] Filed: Dec. 3, 1979

[51] Int. Cl.³ .............................. C04B 7/09; I27B 7/00
[52] U.S. Cl. .................................... 106/100; 432/111; 432/117
[58] Field of Search ................ 106/100, 103; 432/103, 432/105, 106, 107, 111, 113, 116, 117

[56] References Cited

U.S. PATENT DOCUMENTS

| 792,642 | 6/1905 | Williams . |  |
|---|---|---|---|
| 851,765 | 4/1907 | Morgan . |  |
| 1,841,625 | 1/1932 | Musso . |  |
| 1,932,467 | 10/1933 | Keenan . |  |
| 3,007,690 | 11/1961 | Koniewiez . |  |
| 3,169,160 | 2/1965 | Johansson . |  |
| 3,682,453 | 8/1972 | Powell . |  |
| 4,220,476 | 9/1980 | Touborg | 106/100 |

FOREIGN PATENT DOCUMENTS 1021561  11/1977  Canada .

*Primary Examiner*—James Poer
*Attorney, Agent, or Firm*—Beveridge, DeGrandi, Kline and Lunsford

[57] ABSTRACT

Volatiles-rich dust and kiln gases are removed from a cement kiln by means of a special by-pass probe system located in the inlet end of the kiln. The probe system is designated to prevent the build-up of solidified volatiles-rich dust on the probe surfaces.

23 Claims, 7 Drawing Figures

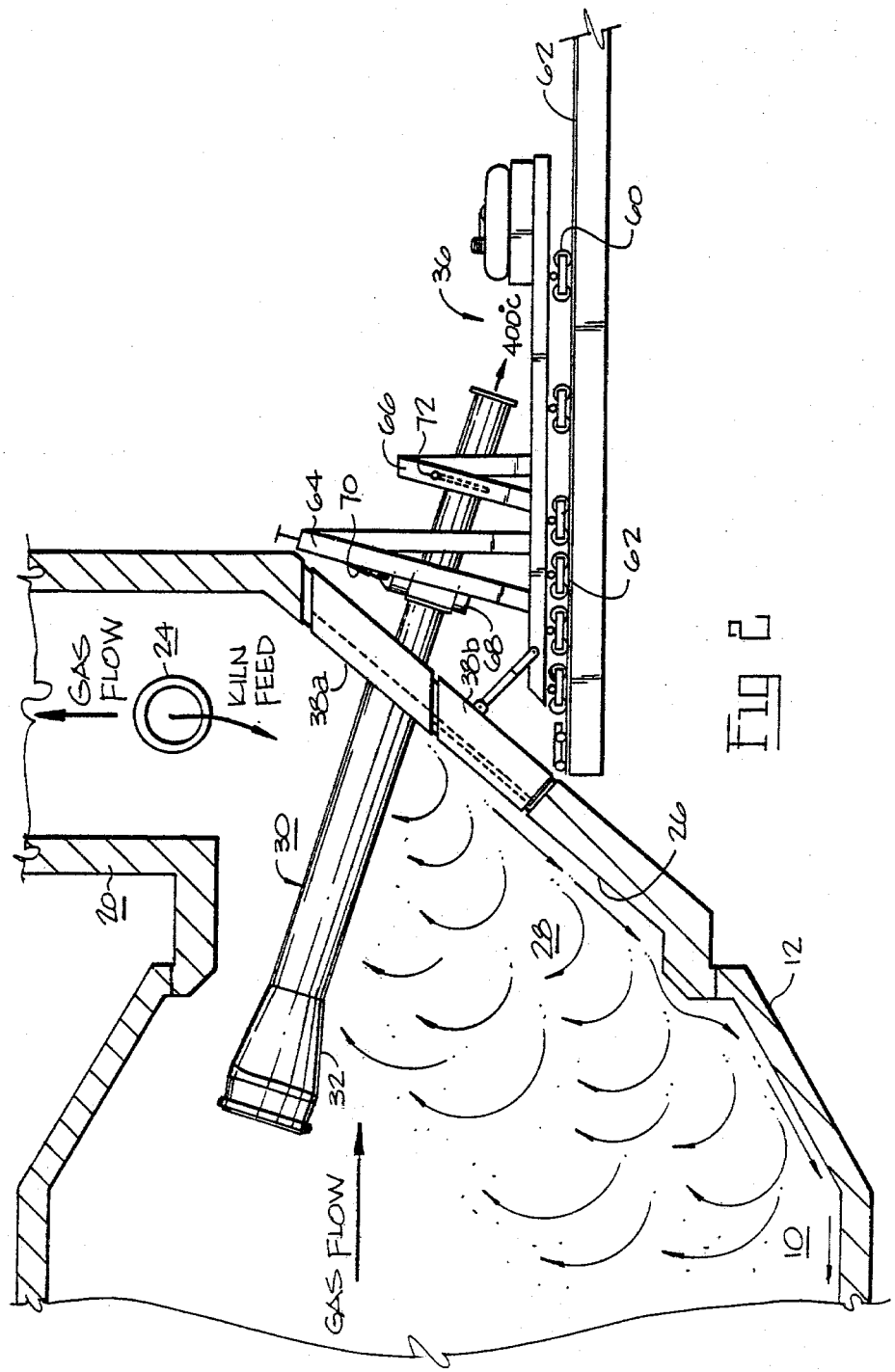

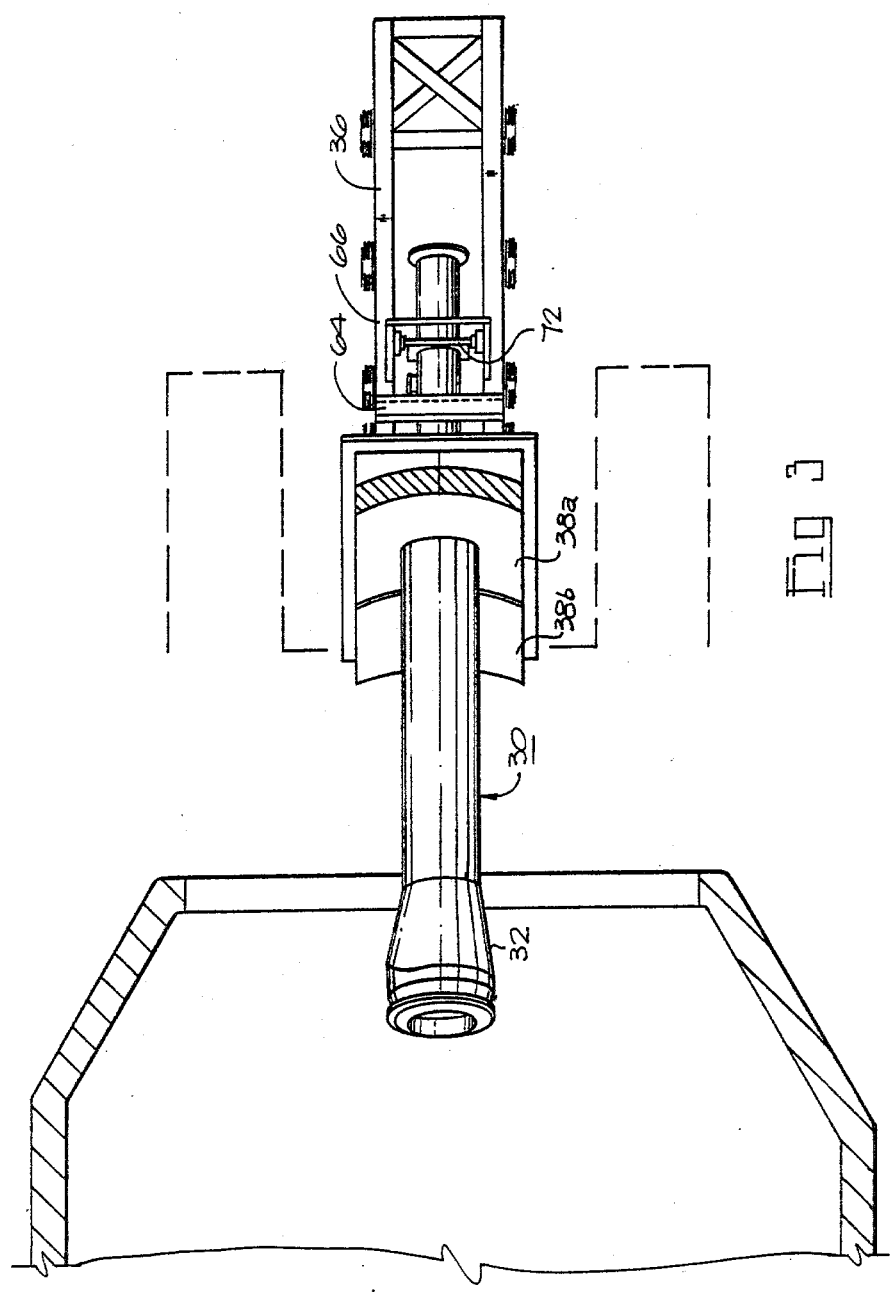

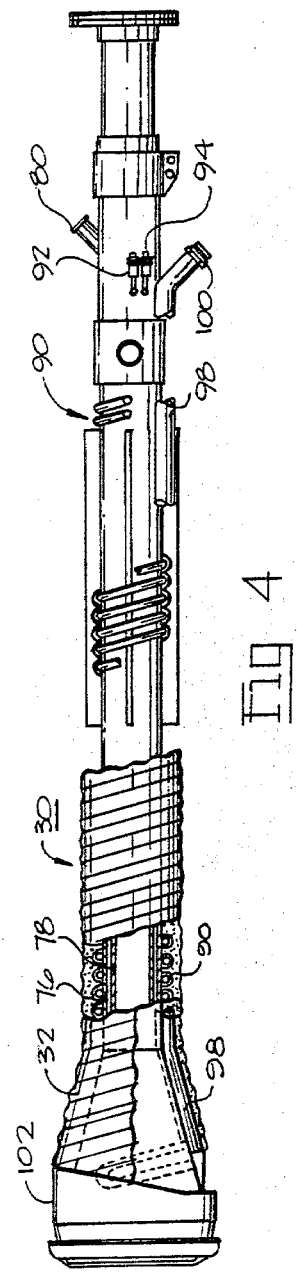
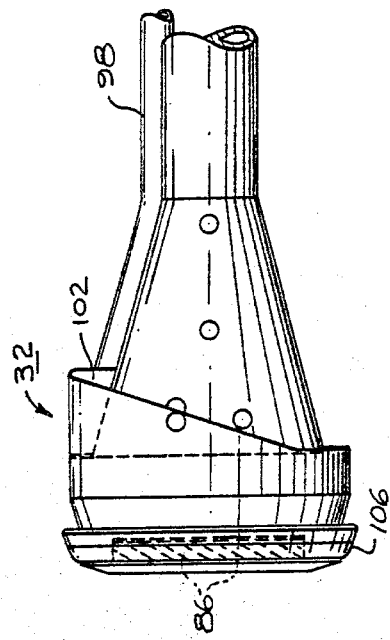
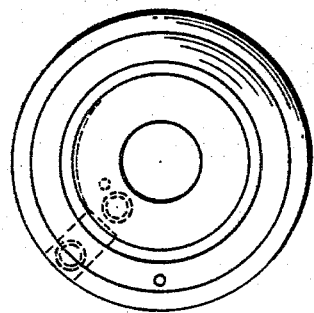

MANUFACTURE OF CEMENT

BACKGROUND OF THE INVENTION

This invention relates to a method and apparatus for reducing the amount of nuisance or volatile compounds that are normally concentrated within the pyroprocess equipment of a cement plant incorporating a rotary kiln in which cement raw feed is burnt to product cement clinker as a stage in cement manufacture.

It has become general practice to effect preheating and hence a partial calcination of the raw cement feed before the raw feed is introduced into the rotary kiln for the main heat treatment. This preheating stage serves to reduce overall fuel consumption. In the main heat treatment, the calcination is completed by a burning or sintering process.

Nearly all cement raw materials contain to some extent compounds with a content of alkali, chlorine or sulphur and these compounds give rise to various drawbacks if their quantity is too great. Under the high temperature conditions encountered, these compounds enter into a gaseous state and are often referred to as "volatile" compounds. The volatile compounds are concentrated within the pyroprocess system (principally the cement kiln) through a volatilization and recondensation process and can disrupt production stability and also diminish cement quality. The most common compounds encountered are $K_2O$, $Na_2O$, Cl, and $SO_3$.

Various attempts have been made in the prior art to reduce the detrimental effect of these nuisance or volatile compounds and certain of these attempts have to a degree been successful but not without causing other forms of drawbacks. For example, in Canadian Pat. No. 1,021,561 issued Nov. 29, 1977 to Christiansen, there is disclosed a process wherein a flow of hot gases is removed from the kiln and such flow is exposed to a "rain" of freely falling condensation bodies which are cold relative to the temperature of the gas flow so that at least a portion of the volatiles in the gas flow condense on such condensation bodies. The condensation bodies are then subjected to impacts or the like to loosen the coating material thereon following when the condensation bodies (which may be in the form of iron balls) are recirculated. The process, among other things, obviously involves the use of relatively complex and costly equipment and adds significantly to the total number of process steps involved.

Many existing installations attempt to reduce the volatile recirculation within the kiln and the volatiles concentration in the cement product through by-passing (eliminating from the pyroprocess system) a percentage of the hot kiln gases at the feed end of the kiln. Since the dust contained in the by-pass gases is enriched in volatile condensate, the potential efficiency of a by-pass system for volatile removal is relatively high. Accordingly, various forms of by-pass systems are in use in many modern cement plants. Unfortunately, due to their design and placement relative to the pyroprocess system, the efficiency of such systems is often severely reduced due to the ingestion by the by-pass system of raw cement feed to the kiln, which raw cement feed obviously does not contain significant concentrations of the volatile material. These existing by-pass systems generally consist simply of a port in the stationary (riser duct) structure at the feed end of the rotating kiln. This port is put under a lower static pressure than that existing in the riser duct such that the desired amount of kiln gases and associated volatile enriched dust is eliminated from the pyroprocess system. The by-pass gases are cooled by mixing with ambient air and are separated from the dust through the use of standard dust separating equipment. However, due to the by-pass port being in close proximity to the system for supplying fresh raw feed to the kiln, such existing by-pass designs are often highly inefficient due to the ingestion of fresh feed as noted above.

SUMMARY OF THE INVENTION

It is accordingly an object of the invention to provide a new and improved system for by-passing or removing hot kiln gases and associated volatiles-rich dust from the kiln interior while at the same time removing as little as possible of the fresh kiln feed material. It is also an object to provide ways and means of protecting the by-pass equipment from the aggressive environment within the kiln, particularly to provide means for preventing continual build-up of dust and solidified volatile compounds on the equipment surfaces.

Accordingly the invention in one aspect relates to a method for removing volatile compounds containing at least one of alkali, chlorine and sulphur from the interior of a rotary cement kiln in which cement raw feed is burnt to produce cement clinker, wherein the raw feed is initially preheated by kiln exit gases and is fed into the inlet end of the rotary kiln to produce in said inlet end a zone of suspended raw kiln feed. The kiln interior in operation is filled with hot kiln gases and suspended volatiles rich dust which in operation move along the kiln toward the inlet end. The improvement comprises providing an elongated hollow probe in the kiln inlet end, the probe having an inlet head disposed at an axial position along the kiln such as to be beyond the most concentrated part of the zone of suspended raw kiln feed and at the same time within the moving hot kiln gases and volatile-rich dust. The method includes withdrawing a portion of the hot kiln gases and volatile rich dust through the probe and thereafter separating the volatile rich dust from the kiln gases which have been withdrawn.

A typical form of the method includes the step of cooling the kiln gases and volatiles containing dust which have been withdrawn before separating the dust from the gases.

According to another feature of the invention a cooling fluid is introduced adjacent the probe inlet head to cool the kiln gases and dust being withdrawn sufficient as to reduce the tendency of the dusts to stick to and build up on the interior surfaces of the hollow probe. In the preferred embodiment the cooling fluid is air. As a further feature the cooling air is introduced so as to form an annular layer separating the kiln gases and dust from the interior surfaces of the probe.

The cooling air is preferably introduced around a peripheral interior portion of the probe inlet head in a tangential direction to form a swirling layer of air adjacent the interior surface of the probe head with such air gradually mixing with the axially moving kiln gases and dust and effecting cooling thereof to below the temperature at which sticking of the dust occurs.

As a further feature of the invention, a further medium is introduced at the probe inlet head in such a direction as to sweep over and envelope at least a part of the exterior surface of the probe thereby to inhibit the sticking of the volatiles rich dust to the exterior probe surfaces. Preferably, such further medium comprises an air suspension of raw kiln feed. Preferably such suspension is emitted from an annular slot surrounding the probe inlet head.

The invention in a further aspect comprises a cement plant which incorporates an elongated hollow probe disposed in the inlet end of the cement plant kiln with the probe having an inlet head disposed at an axial position along the kiln such as to be located within the flow of hot kiln gases and volatile rich dust and substantially beyond the zone of suspended raw kiln feed. Means are provided for withdrawing and by-passing a portion of the hot kiln gases and volatile rich dust through the probe and means are included for separating the volatile rich dust from the gases after their withdrawal through the probe from the kiln.

The invention in a still further aspect provides a probe for use in a cement kiln comprising an elongated tubular body having an inlet head adapted to be positioned within a cement kiln for the withdrawal of kiln gases and suspended volatile rich dust therethrough. Such probe includes means for introducing a cooling fluid adjacent the inlet head to effect cooling of the kiln gases and dust which are being withdrawn through the probe.

The above-noted means for introducing the cooling fluid are adapted to direct flow of air in an annular layer around the interior of the probe head to initially separate the kiln gases and dust from interior surfaces of the probe.

Preferably, the means for introducing the cooling air comprises an annular slot defining means disposed around a peripheral interior portion of the probe head for introducing the air in the form of the annular layer. In the preferred embodiment there are provided vanes associated with the annular slot for effecting a swirling motion of the cooling air as it moves along the interior surfaces of the probe head.

As a further feature of the invention there are provided means for introducing a further fluid medium at the probe inlet head in such a way as to cause same to sweep over and envelope the exterior surface of the probe with such further fluid medium to inhibit sticking of the kiln dust thereto.

In a typical embodiment, the probe inlet head has a peripheral discharge slot defined on its exterior with a distribution manifold communicating with the discharge slot. A pump is provided for supplying the further fluid medium under pressure to the manifold. The pump is of a type adapted to convey a raw kiln feed and air suspension to the manifold for discharge of the suspension through the discharge slot. The annular cloud of raw kiln feed thus set up around the probe exterior has been found to be very effective in preventing condensation of and sticking of the volatiles rich dust on the probe surfaces.

BRIEF DESCRIPTION OF THE VIEWS OF DRAWINGS

FIGS. 2 and 3 are side elevation and plan views respectively of a probe assembly in accordance with the invention and its associated support structure positioned at the inlet end of the cement kiln;

FIG. 4 is an elevation view of the probe per se with certain of the internal structures being illustrated in phantom;

FIG. 5 is a view of the head portion of the probe rotated 180° about its axis from the position of FIG. 4;

FIG. 6 is an end elevation view of the probe head;

DETAILED DESCRIPTION OF THE PREFERRED EMBODIMENT

Figure 1:
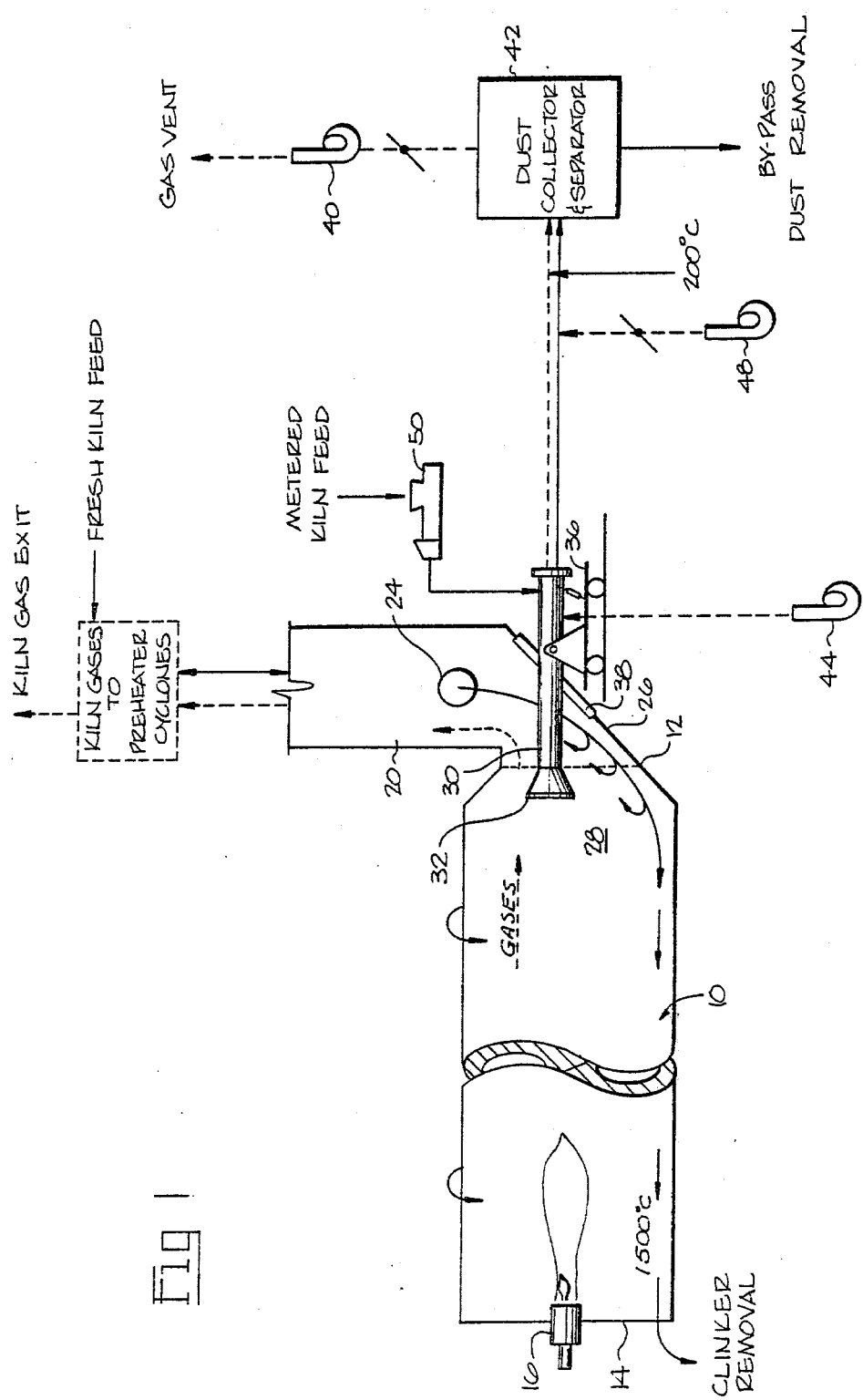
FIG. 1 is a schematic drawing of a rotary cement kiln and associated structure incorporating the improved structure according to the invention.

Referring firstly to FIG. 1 which is a schematic drawing of a portion of a cement plant incorporating a probe assembly according to the invention, there is illustrated a rotary kiln 10 within which the cement feed is pyro-processed. The kiln is of a conventional structure including a steel drum lined with fire brick and supported at intervals on rollers (not shown). The drum is usually several hundred feet long (e.g. 500 feet) and may have a diameter in the order of 12-20 ft. The kiln is usually rotated at a speed of about 65 to 75 revolutions per hour and the kiln is inclined from the horizontal by a small amount so that the materials being processed move gradually away from the inlet end 12 of the kiln toward the exit end 14 with the cement clinker escaping from the kiln via a suitable exit (not shown). The exit end of the kiln 10 is provided with a suitably sized burner 16 which projects a blast of flame axially along the kiln. The maximum temperature achieved in the kiln is usually something in the order of 1550° C. in order to ensure the combination of practically all the lime with the clayey constituents of the feed material.

During operation, the above-noted burner sets up a flow of kiln gases which move axially along the kiln toward the inlet end 12. As these gases move toward the inlet end 12 they gradually decrease in temperature so that on approaching the inlet end 12 the temperature can be expected to be in the order of 750°–1000° C. These gases contain an appreciable portion of suspended kiln dust, such dust being relatively richly laden with liquid phase volatile constituents of the type referred to previously in the specification.

The above-noted hot kiln gases pass via the inlet end 12 of the kiln into a kiln feed structure 20. The kiln gases pass upwardly through feed structure 20 and thence into a bank of preheater cyclones diagrammatically indicated at 22. Preheater cyclones for use in cement kilns are well known in the art (reference being had to Canadian Pat. No. 1,021,561) and need not be described in detail. The fresh kiln feed is supplied to the preheater cyclones with the kiln gases coming into intimate contact with this fresh powder feed thus heating same thoroughly and effecting a partial calcination. The heated fresh kiln feed then passes downwardly from the preheater cyclone bank and enters into the kiln feed structure 20 through a suitable feed port 24 with the fresh feed material then passing along inclined wall 26 of the feed structure and into the inlet end 12 of kiln 10.

As the preheated fresh kiln feed passes along the sloping wall 26 into the inlet end 12 of the kiln, the effect of the kiln gases which are moving toward the inlet end as well as the rotary action of the kiln tend to create a zone of turbulence indicated generally at 28. Within this zone of turbulence there is of course a high percentage of suspended raw kiln feed.

In accordance with the teachings of the present invention there is provided a by-pass probe 30 generally in the form of a hollow elongated body, the probe 30 having an inlet head 32 disposed at an axial position along the kiln 10 such as to be beyond the most concentrated part of the zone of suspended raw kiln feed. At the same time, this inlet head is disposed within the kiln gases and volatiles-rich dust which are moving toward kiln inlet 12.

The probe 30 is mounted on a carriage 36 thereby to permit the same to be inserted into and retracted from the kiln, the probe 30 also being equipped with a suitable door 38 which sealingly engages with the lower inclined wall 26 of the kiln feed structure. The probe 30 can be oriented angularly in a vertical plane to the extent desired by a means to be described hereinafter.

In order to effect withdrawal of a portion of the kiln gases and volatile-rich dust through the probe 30, the system includes an induced draft fan 40 which is connected via suitable duct work to a conventional dust collector system 42 which may be either of the conventional bag-house variety or alternatively an electrostatic precipitator. The gases emitted from the induced draft fan 40 are either released to atmosphere or passed through additional heat exchange equipment as desired, while the dust collected in dust collector 42 is removed therefrom in a suitable manner and forwarded on for disposal.

The system illustrated in FIG. 1 also includes a fan 44 which supplies primary cooling air to the inlet head 32 of probe 30. This system will be described in further detail later on. One of the effects of the primary cooling air is to cool the gases and dust which are passing through the probe so that shortly after the inlet head 32 the gases and dust have a temperature in the order of 400°–500° C. At this temperature no liquid phase is pesent in the volatile constituents and thus there is no likelihood of such dusts sticking to the probe interior and to the conduit carrying such gases into the dust collector 42. A further fan 48 is also provided which supplies a secondary stream of cooling air to the conduit extending from the probe 30 to the dust collector 42. The purpose of the secondary cooling air is to simply cool the kiln gases further as, for example, down to a temperature of approximately 200° C. thereby to avoid unduly high temperatures which might damage the dust separator or collector 42.

The system illustrated in FIG. 1 also includes a special pumping system 50 including a blower for supplying an air-raw kiln feed suspension in a relatively concentrated manner to the probe 30, with such feed suspension being emitted from the head of the probe 32 in a manner to be described in further detail hereinafter.

By way of general comment, it has previously been noted that the probe 30 is disposed in the inlet end of the kiln such that the inlet head 32 projects inwardly of and somewhat beyond the turbulent dusty zone of suspended raw kiln feed 28. If the probe 30 is not inserted sufficiently far beyond this zone, undue amounts of fresh kiln feed will be withdrawn through the probe thus reducing the efficiency of the operation since the objective is to withdraw the volatiles-rich dust and as little as possible of the fresh kiln feed. The axial extent of the zone of turbulence 28 varies somewhat depending upon the structure of the feed inlet portion of the kiln. A certain amount of trial and error experimentation may be necessary to determine the best location for the inlet end of the probe 32 and small scale sampling techniques can be employed to find out the location where only a minimal amount of fresh kiln feed is ingested by the probe.

With reference to FIGS. 2 and 3, it will be seen that the probe 30 is mounted on the previously mentioned carriage 36, the latter being rollingly supported on wheels 60 for movement along spaced tracks 62. The carriage 36 includes spaced front and rear support frames 64 and 66, which together serve to support the probe 30 on the carriage. The front support frame 64 includes a guide frame 68 which embraces the probe, the upper portion of guide frame 68 being connected to hydraulic rams 70 which can be retracted or extended thereby to cause the probe to pivot in a vertical plane about a pivot axle 72 which is operatively associated with the rear support frame 66.

The door 38 which snugly fits in a suitably sized opening in the kiln inlet feed structure 20 is made in two portions, i.e. an upper portion 38a and a lower portion 38b. Suitable hydraulic controls (not shown) are provided for opening and closing of the door sections 38a and 38b of the door and the door is provided with a suitable air tight seal around its peripheral portions thereby to avoid leakage of gases between the door assembly and the inlet feed structure of the kiln. The precise details of the door construction will of course vary from installation to installation and those skilled in the art will readily be able to provide a suitable door configuration and mounting assembly for any particular installation.

The probe 30 is shown in detail in FIGS. 4–7 to which reference will now be made.

The probe 30, as noted previously, comprises an elongated tubular body of circular cross-section and having a somewhat enlarged inlet head 32 generally of conical shape. The exterior surface of the probe 30 is covered with a layer of suitable castable refractory installation thereby to protect the probe from the high temperatures encountered in use.

The probe 30 includes a pair of spaced apart concentric outer and inner metal walls 76, 78 respectively, with the inner wall extending the full length of the probe and defining the flow passage for the kiln gases, with the annular space defined between concentric walls 76 and 78 defining a passage for the flow of primary cooling air to the extreme forward end portion of inlet head 32. A suitable inlet pipe 80 positioned adjacent the rear end of the probe 30 is adapted for connection to the outlet of the previously noted primary air supply fan 44. The primary air thus flows between outer and inner walls 76 and 78 toward the head of the probe in a direction given by arrows A until it reaches an inwardly curled annular guide 82 positioned at the mouth of the inlet head 32 and extending completely therearound. The annular guide 82 serves to define between itself and the outer end of wall 78 a relatively narrow annular slot 84. Positioned in the annular slot 84 are a plurality of swirl vanes 86 disposed in circumferentially spaced apart relationship all around the inlet mouth of the inlet head 32 and positioned at a suitable angle, e.g. about 30°, to the longitudinal axis of the probe. The purpose of the swirl vanes 86 is to impart to the incoming primary cooling air a swirling motion thereby to produce an annular layer of swirling air which moves along the interior of the probe just inside of the inner wall 78 thereof. The purpose of this annular layer of air is to initially separate the kiln gases and the volatiles-rich dust from the interior surfaces of the probe to prevent the volatiles-rich dust containing liquid phase components from sticking to the inner wall 78. As the kiln gases and dust move further down into the probe, this annular layer of air gradually mixes with the kiln gases and dust and decreases the temperature thereof below the solidification point of the volatiles following which there is little or no tendency for such materials to stick to the inner walls 78 of the probe.

The volume of primary cooling air emitted through slot 84 should be sufficient to bring the hot kiln gases and associated dust down from the initial temperature just before the probe head of from 750°–1000° C. to a temperature in the order of about 400°–500° C. at which point the volatiles associated with the kiln dust will have solidified. Thus, the amount of cooling primary air will be dependent upon the amount of total kiln gas flow through the probe. It is contemplated that in a typical operation the probe 30 will withdraw about 5% of the total kiln gas flow, with the remaining 95% of the kiln gases proceeding through the preheater cyclones 22 as described previously. Since the total kiln gas flow can readily be determined for any particular operation, the amount of primary cooling air required to produce the temperature drop noted above can readily be calculated.

In order to prevent over-heating of the probe metal parts, the probe 30 is shown as having the outer shell 76 wrapped with a spirally disposed set of water cooling tubes 90. The cool water enters at 92 and exits at 94. The spirally wound cooling tubes extend along a major portion of the length of the probe 30 and along over somewhat more than half of the conically shaped inlet head as illustrated by the dashed line in FIG. 4. It is noted here that the water cooling system provided by tubes 90 is not considered to be essential in many cases. However, the water cooling system provides valuable protection against over-heating and consequent damage to the by-pass probe. It is thus desirable to provide the supplementary water cooling so that it can be put into operation in the event that the temperature of the probe shell exceeds the temperature desired.

Figure 7:
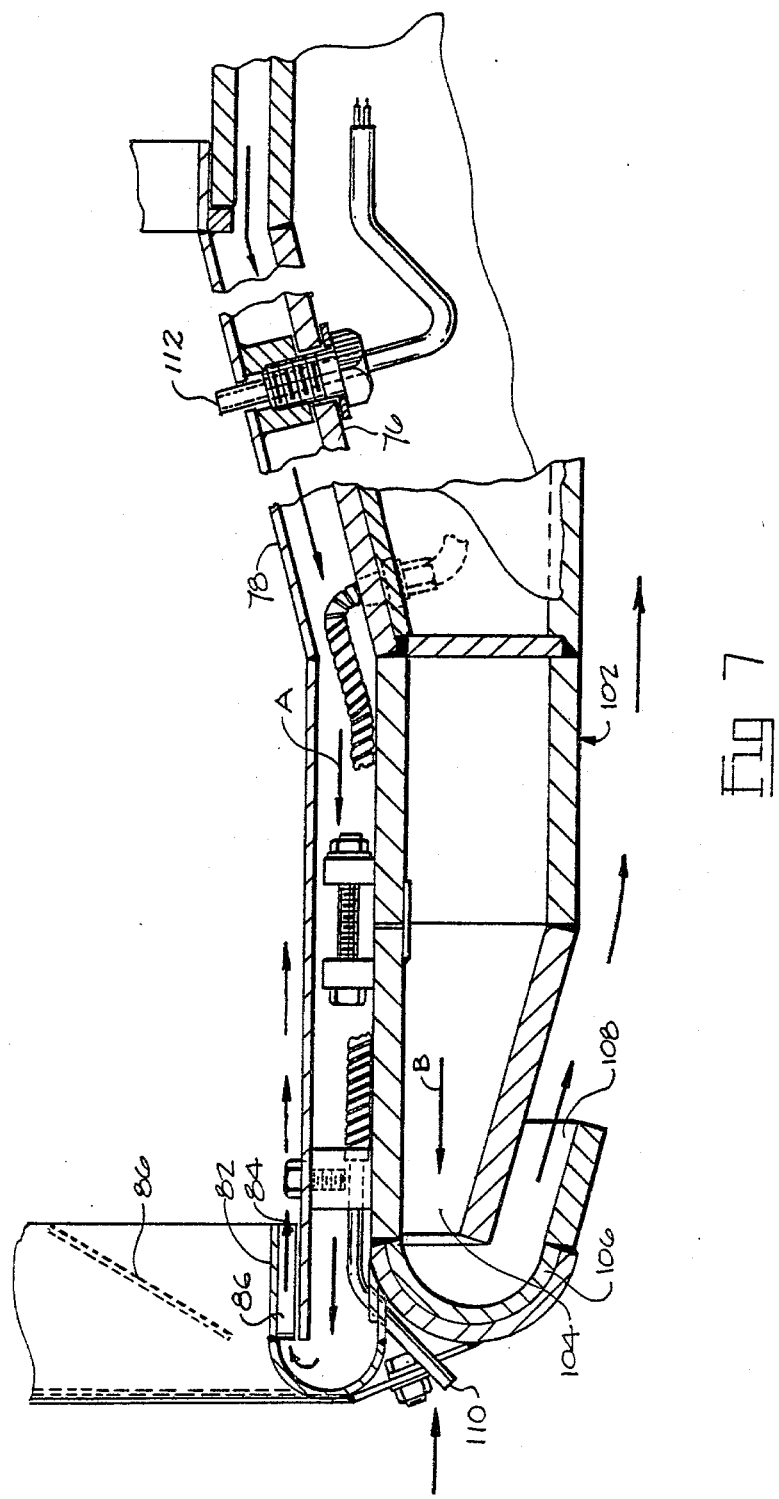
FIG. 7 is a half section view of the inlet end of the probe head.

The system for inhibiting build-up of the volatiles-rich dust on the exterior surfaces of probe 30 will now be described. Basically, the system comprises a means for causing a relatively dense cloud of suspended raw kiln feed material to sweep over the exterior surfaces of the probe thereby to form a barrier between the exterior probe surfaces and the volatiles-rich dust contained in the kiln gases. Reference was made previously to pumping system 50 for supplying raw kiln feed to the head 32 of the by-pass probe. This pumping system is of a commercially available variety which is capable of conveying a relatively highly concentrated air-kiln feed suspension through a conduit under pressure. A suitable pumping system is made by SUTORBILT Blower Co., a division of The Fuller Company of Pennsylvania, U.S.A., under Model No. 8 HVB. In order to convey the kiln-feed and air suspension to the head of the probe, the probe is provided with an elongated conduit 98 extending therealong and having an inlet 100, the conduit 98 terminating in a manifold arrangement 102 which extends completely around the probe head 32 just rearwardly of its mouth. The manifold 102, as best seen in FIGS. 4, 5 and 7, is of a relatively simple construction and defines an annular chamber which gradually decreases in radial dimension and in cross-sectional area toward the inlet mouth of the probe head. The bottom wall of the manifold is in the form of a spiral so that the annular chamber has maximum axial extend at the point where the conduit 98 is connected to it, thereafter decreasing in axial extent to the degree necessary to maintain a desired velocity in the suspension as it moves around the manifold. The incoming suspension through conduit 98 enters into the manifold 102 and its velocity increases in the direction of arrow B as it moves toward the annular metering slot 104. This annular metering slot 104 defines an exit area just large enough so that the resulting pressure drop across is sufficiently large as to ensure generally uniform flow distribution all around the probe head 32. After the suspension emerges through the metering slot it encounters a flow reversing vane 106 of annular shape which rotates the annular flow around an angle of 180° thus turning the flow rearwardly and along the annular exit passage 108. Thus, the relatively highly concentrated suspension flows as an annular sheet rearwardly over the exterior surfaces of the probe head and along a substantial portion of the remainder of the length of the probe before mixing with the kiln gases and dust. The net result is that the layer of concentrated raw feed suspension protects the exterior surfaces of the probe from substantial contact with the volatiles-rich dust associated with the kiln gases and thus prevents the build-up of significant deposits on the probe head. The amount of raw kiln feed to be utilized in the manner described above will vary somewhat from one installation to another, but as a general rule, good results can usually be obtained if the amount of raw kiln feed supplied via the probe head is maintained at very approximately 1%–2% of the total amount of raw feed into the kiln 10. The raw kiln feed to air suspension ratio supplied by the above noted pumping system is typically about (0.2) lbs. raw feed per cubic foot of air at a pressure of (9) psi and the exit velocity of the suspension through passage 108 is typically in the order of (35) fps.

It is also noted here that the embodiment described above provides for generally isokinetic gas flow conditions at the entrance to the probe head 32. That is, the inlet area at the probe head is preferably chosen so that the by-pass flow is not subjected to substantial velocity change at the point of entry into the probe head; however, the gas flow is subsequently accelerated as it moves into the converging passage provided by the probe head and toward the generally uniform cross-section passage defined through the remainder of the probe. The relatively slender probe has been found not to offer any substantial obstruction to the main gas flow out of the inlet end of the kiln which, of course, is an advantageous feature.

The probe head 32 may be equipped with thermocouples for sensing the termperature of the gas flows. Thermocouple 110 adjacent the mouth of the inlet head provides a measure of the incoming kiln gas temperature, while additional thermocouples, such as 112, positioned within the probe at suitable intervals, allow the temperature of the by-pass gas flow to be monitored and controlled as by varying the flow of primary cooling air.

It will therefore be seen that the system described above includes a probe which is inserted axially with respect to the kiln into the kiln gas flow to such a point where ingestion of fresh kiln feed is substantially eliminated with the volatile enriched dust being drawn out of the kiln through the probe to a typical external dust collection system. The system described above employs means for preventing a continual build-up of dust and solidified volatile compounds on the probe surfaces. The system described above prevents build-up of the materials on the internal surfaces of the by-pass probe and the basic principle in this case involves cooling the by-passed kiln gases and associated dust below the sticking temperature and at the same time avoiding direct contact with the by-pass probe internal surfaces. It will be seen that the system described above provides for the injection of cooling air tangentially into the conical region at the by-pass probe inlet thereby to provide a layer of cooling air separating the ingested kiln gas and dust from the internal surfaces of the probe. At the same time the gradual mixing of the axially flowing hot kiln gases and dust with the tangentially flowing cooling air assures a resultant temperature which is below that where build-up may occur. The prevention of build-up on the external surfaces of the probe described above entails pumping new kiln feed, which is in the form of finely ground solid, into the kiln gas stream from the inlet region of the probe so as to envelope the exterior surfaces of the probe head with a cloud of kiln dust which is of very low volatile content. This cloud of dust dissipates as it moves along the probe and mixes with the high volatiles content dust with the overall volatiles concentration of the dust mixture becoming sufficiently low that sticking does not occur.

We claim:

1. A method of removing volatile compounds containing at least one of alkali, chlorine and sulphur from the interior of an elongated rotary cement kiln in which cement raw feed is burnt to produce cement clinker; wherein the raw feed is initially preheated by kiln exit gases and is fed into the inlet end of the rotary kiln to produce in said inlet end a zone of suspended raw kiln feed, the kiln interior being filled with hot kiln gases and suspended volatiles-rich dust, which in operation move along the kiln toward the inlet end, the improvement comprising providing an elongated hollow probe in the kiln inlet end; the probe having an inlet head disposed at an axial position along the kiln such as to be beyond the most concentrated part of the zone of suspended raw kiln feed and within the moving hot kiln gases and volatiles-rich dust; withdrawing a portion of the hot kiln gases and the volatiles-rich dust through said probe; and separating the volatiles-rich dust from the kiln gases which have been withdrawn through said probe.

2. The method of claim 1 including the step of cooling the kiln gases and volatiles containing dust which have been withdrawn before separating the volatiles-rich dust from the gases.

3. The method according to claim 2 wherein a cooling fluid is introduced adjacent the probe inlet head to cool the kiln gases and dust being withdrawn sufficient as to reduce the tendency of the volatiles-rich dust to stick to and build up on the interior surfaces of the hollow probe.

4. The method according to claim 3 wherein the cooling fluid is air.

5. The method according to claim 4 wherein the cooling air is introduced so as to form an annular layer separating the withdrawn kiln gases and dust from interior surfaces of the probe head.

6. The method of claim 5 wherein the cooling air is introduced around a peripheral interior portion of the probe inlet head in a tangential direction to form a swirling layer of air adjacent the interior surface of the probe head, such air gradually mixing with the axially moving kiln gases and dust and effecting cooling thereof to below the temperature at which sticking of the dust occurs.

7. The method according to any one of claims 3, 5 or 6 wherein a further medium is introduced at the probe inlet head in such a direction as to sweep over and to envelope at least a part of the exterior surface of the probe with the further medium to inhibit the sticking of the volatiles-rich dust to exterior probe surfaces.

8. The method according to any one of claims 3, 5 or 6 wherein a further medium is introduced at the probe inlet head in such a direction as to sweep over and to envelope at least a part of the exterior surface of the probe with the further medium to inhibit the sticking of the volatiles-rich dust to exterior probe surfaces, and wherein said further medium comprises an air suspension of raw kiln feed.

9. The method according to any one of claims 3, 5 or 6 wherein a further medium is introduced at the probe inlet head in such a direction as to sweep over and to envelope at least a part of the exterior surface of the probe with the further medium to inhibit the sticking of the volatiles-rich dust to exterior probe surfaces, and wherein said further medium comprises an air suspension of raw kiln feed, said suspension being emitted from an annular slot surrounding the probe inlet head.

10. The method of claim 3, 4 or 5 wherein the interior surfaces of the probe are further cooled by passing a further cooling fluid adjacent thereto.

11. A cement plant including an elongated rotary kiln in which cement raw feed is burnt to produce cement clinker, the kiln interior, in operation, containing hot kiln gases and suspended volatiles-rich dust, the kiln having an inlet end into which is fed raw cement feed which has been preheated by kiln exit gases thus producing in said inlet end a zone of suspended raw kiln feed; the kiln gases and the suspended dust tending to flow toward the kiln inlet end during operation, wherein the improvement comprises an elongated hollow probe disposed in the inlet end of the kiln; the probe having an inlet head disposed at an axial position along the kiln such as to be located within the flow of hot kiln gases and volatiles-rich dust and substantially beyond the zone of suspended raw kiln feed, means for withdrawing a portion of the hot kiln gases and volatiles-rich dust through the probe; and means for separating the volatiles-rich dust from the gases after their withdrawal through the probe from the kiln.

12. The cement plant of claim 11 including means for introducing a cooling fluid adjacent the inlet head of the probe to cool the kiln gases and dust being withdrawn sufficiently as to reduce the tendency of the volatiles-rich dust to adhere to interior surface portions of the probe.

13. The cement plant of claim 12 wherein the means for introducing the cooling fluid are adapted to supply a flow of air in an annular layer around the interior of the head of the probe to initially separate the kiln gases and dust from interior surfaces of the probe.

14. The cement plant of claim 13 wherein the means for introducing the cooling air comprises annular slot defining means disposed around a peripheral interior portion of the head of the probe for introducing the air in the form of the annular layer.

15. The cement plant of claim 14 including vanes associated with the annular slot defining means for effecting a swirling motion of the cooling air as it moves along the interior surfaces of the probe head.

16. The cement plant according to any one of claims 12, 13 or 14 having means for introducing a further medium at the probe inlet head in such a way as to envelope the exterior surface of the probe with said further medium to inhibit sticking of the kiln dust thereto.

17. The cement plant according to any one of claims 12, 13 or 14 having means for introducing a further medium at the probe inlet head in such a way as to envelope the exterior surface of the probe with said further medium to inhibit sticking of the kiln dust thereto, wherein the probe inlet head has a peripheral discharge slot defining means on its exterior, a distribution manifold communicating with the discharge slot, and pump means for supplying the further medium under pressure to the manifold, the pump means being of a type adapted to convey a raw kiln feed and air suspension to said manifold for discharge of the suspension through the discharge slot.

18. A probe for use in a cement kiln comprising an elongated tubular body having an inlet head adapted to be positioned within a cement kiln for the withdrawal of kiln gases and suspended volatiles-rich dust therethrough, the probe including means for introducing a cooling fluid adjacent the inlet head to effect cooling of the kiln gases and dust being withdrawn through the probe.

19. The probe of claim 18 wherein the means for introducing the cooling fluid are adapted to direct a flow of air in an annular layer around the interior of the head of the probe to initially separate the kiln gases and dust from interior surfaces of the probe.

20. The probe of claim 19 wherein the means for introducing the cooling air comprises annular slot defining means disposed around a peripheral interior portion of the head of the probe for introducing the air in the form of the annular layer.

21. The probe of claim 20 including vanes associated with the annular slot defining means for effecting a swirling motion of the cooling air as it moves along the interior surfaces of the probe head.

22. The probe according to any one of claims 18, 19 or 20 having means for introducing a further fluid medium at the probe inlet head in such a way as to sweep over and envelope the exterior surface of the probe with said further fluid medium to inhibit sticking of the kiln dust thereto.

23. The probe according to any one of claims 18, 19 or 20 having means for introducing a further fluid medium at the probe inlet head in such a way as to sweep over and envelope the exterior surface of the probe with said further fluid medium to inhibit sticking of the kiln dust thereto, wherein the probe inlet head has a peripheral discharge slot defining means on its exterior, a distribution manifold communicating with the discharge slot, and pump means for supplying the further medium under pressure to the manifold, the pump means being of a type adapted to convey a raw kiln feed and air suspension to said manifold for discharge of the suspension through the discharge slot.

* * * * *